United States Patent [19]
Fedun

[11] Patent Number: 5,828,002
[45] Date of Patent: Oct. 27, 1998

[54] ELECTRICAL BOX SUPPORT FRAME

[76] Inventor: Wayne Fedun, 897 Old Liberty Rd., Monticello, N.Y. 12701

[21] Appl. No.: 863,976

[22] Filed: May 27, 1997

[51] Int. Cl.$^6$ ...................................................... H05K 5/02
[52] U.S. Cl. ................................ 174/58; 220/3.5; 220/3.9
[58] Field of Search ................................ 174/58, 53, 55; 33/528, DIG. 10; 220/3.3, 3.5, 3.6, 3.9; 248/906

[56] References Cited

U.S. PATENT DOCUMENTS

| | | | |
|---|---|---|---|
| 1,392,360 | 10/1921 | Searle | 33/528 X |
| 1,791,311 | 10/1931 | Hamblen | 220/3.6 |
| 1,816,584 | 7/1931 | Hussar | 220/3.6 |
| 1,820,309 | 8/1931 | Judd et al. | 220/3.9 X |
| 1,933,053 | 5/1933 | Glattly | 247/21 |
| 2,456,450 | 12/1948 | Sauter | 220/3.6 X |
| 2,518,912 | 3/1950 | Lampe | 248/27 |
| 2,788,187 | 4/1957 | Cookson et al. | 248/27 |
| 3,337,168 | 8/1967 | Albrecht | 220/3.5 X |
| 3,437,737 | 4/1969 | Wagner | 174/55 |
| 3,630,406 | 12/1971 | Hammes | 220/3.3 |
| 4,134,636 | 1/1979 | Kleinatland et al. | 174/528 X |
| 4,576,431 | 3/1986 | Thayer | 339/131 |
| 4,685,035 | 8/1987 | Nanjoh | 174/58 X |
| 4,733,330 | 3/1988 | Tanaka et al. | 174/58 X |
| 4,793,069 | 12/1988 | McDowell | 33/528 |
| 4,892,212 | 1/1990 | Andreyko | 220/3.3 |
| 4,998,635 | 3/1991 | Vink et al. | 248/906 X |
| 5,158,478 | 10/1992 | Schuplin | 439/538 |

FOREIGN PATENT DOCUMENTS

| | | | |
|---|---|---|---|
| 477741 | 10/1951 | Canada | 220/3.6 X |

*Primary Examiner*—Dean A. Reichard
*Attorney, Agent, or Firm*—Sandra M. Kotin

[57] ABSTRACT

A flat rectangular frame for use on the outside surface of a wall. The frame has a central rectangular aperture for mounting and supporting an electrical box in a wall opening and most especially when there is no internal wall support or the opening cut in the wall is considerably larger than the electrical box. Two electrical box holders are used in combination with the frame and rest within the wall with the fingers folded down over the sides of the electrical box exerting pressure so that the retaining tabs of the electrical box engage the front surface of the frame. The method of use of the frame where it is placed over the wall opening, the holders placed inside the wall opening, the electrical box inserted through the aperture into the opening with the retaining tabs engaging the outside of the frame, and the fingers of the holders bent down over the sides of the electrical box holding it securely against the frame.

11 Claims, 2 Drawing Sheets

ELECTRICAL BOX SUPPORT FRAME

FIELD OF THE INVENTION

The instant invention relates to a frame that is situated on the outside of the wall for mounting an electrical box when there is no support for the box within the wall or the wall opening is considerably larger than the box, and the method for using the frame.

BACKGROUND OF THE INVENTION

When a building is constructed electrical boxes are usually mounted to the studs within the wall. The stud provides support and anchors the box. The location of the electrical boxes is determined by the requisites of the room and the location of the studs. Later, when additional electrical connections are required it is often necessary to add new electrical boxes where there is no anchoring stud or other support within the wall. There have been a variety of devices developed to retain electrical boxes when there are no internal anchoring means. To date, these all function from within the wall. Hamblen, in U.S. Pat. No. 1,791,311, teaches a rectangular clamp with flexible holding strips. An opening is cut in the wall, larger than the electrical box, but permitting the retaining tabs of the box to rest against the edges of the wall opening. The clamp is placed inside the wall to register with the opening. The strips fold over the edges of the opening securing the clamp in place. The electrical box is thereafter inserted into the opening and screws through the retaining tabs of the box also engage the clamp through appropriately placed holes in its surface. Cookson, et al., U.S. Pat. No. 2,788,187, developed a plate with flexible fingers that fold over the sides of the wall opening. The opening in the plate is the same size as the wall opening and the screws holding the electrical box pass through the wall and engage the plate. Lampe, in U.S. Pat. No. 2,518,912 shows a similar device but the fingers fold over the edges of the electrical box holding it against the opening with screws anchoring the box to the wall and engaging the plate inside the wall.

Plates used to accommodate electrical conduits, but not to support electrical boxes, attach to the outside of a wall opening and use flexible fingers that bend around the opening to hold such plates in place. Some are further secured to the wall with screws. All of these plates are attached to the wall. (U.S. Pat. Nos. 3,630,406; 4,576,431; and 4,892,212)

Glattly uses a bracket that folds for easy insertion into the wall opening and thereafter is retained by lips that engage the wall at the top and bottom of the wall opening. Screws that hold the box in place also engage the bracket inside the wall. (U.S. Pat. No. 1,933,053)

None of the above devices will work if the opening cut into the wall is too large or is irregular. There is a need for an electrical box support means that rests on the outside of the wall and one that can be used when the wall opening is cut too large or is irregular.

BRIEF SUMMARY OF THE INVENTION

The present invention provides a simple frame with a central rectangular opening that rests on the outside of the wall and when used in combination with any electrical box holders known in the art securely supports an electrical box.

It is an object of the present invention to have an electrical box support frame that securely holds the electrical box even if the opening is considerably larger than the box or is irregular in shape.

It is another object of the present invention to have an electrical box support frame that is easy to use and does not require screw holes or other means of potential damage to the wall.

Another object of the present invention is to have an electrical box support frame that can be used with walls of any composition and any thickness.

A further object of the present invention is to have an electrical box support frame that is easy and inexpensive to manufacture.

A still further object of the present invention is to provide an electrical box support frame that installs quickly, does not require attachment to the wall and does not detract from the appearance of the wall.

Other features and advantages of the invention will be seen from the following description and drawings.

DETAILED DESCRIPTION OF THE INVENTION

The electrical box support frame of the instant invention serves two functions. First, when used with any electrical box holders, it securely retains an electrical box in the wall without the need for further anchoring from within the wall. Second, if the wall opening is too large due to cracking or chipping of the wall board, or because the electrical box being replaced was larger than the replacement box, or if the wall structure itself is weak, the electrical box support frame will cover the opening without detracting from the appearance of the wall and securely support the electrical box. The frame of the instant invention covers the opening and the central opening in the frame is sized to exactly accommodate the electrical box so the box cannot move or shift once it is installed.

Figure 2:
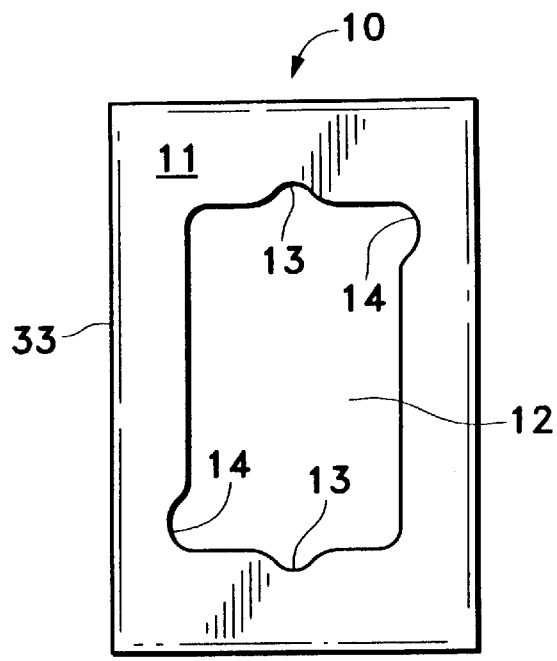
FIG. 2 is a front view of the electrical box support frame of the instant invention.

The electrical box support frame 10 as seen in FIG. 2 is a rectangular plate 11 made of any thin rigid non-conducting material, such as wood or any one of a number of polymeric or plastic materials. There is a rectangular opening 12 cut out of the center sized to accommodate the standard electrical box 17. There are two small recesses 13 at the midpoints of the upper and lower edges of the central opening 12 and slightly larger recesses 14 on each side edge, diagonally offset from each other. The side recesses 14 are situated to make room for projections often found on the outside edges of the electrical boxes made of metal. The outer edges 33 of the frame 10 may be squared, rounded or beveled.

Figure 1:
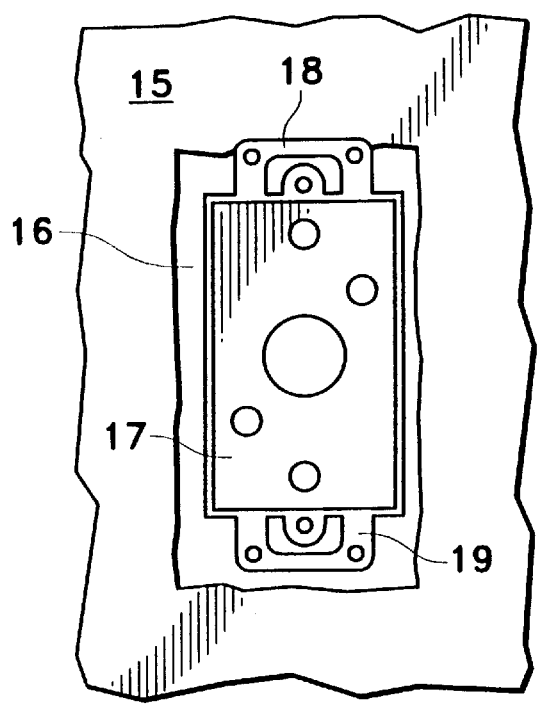
FIG. 1 is a front view of an electrical box set into an opening in a wall that is larger than the electrical box and provides no means to support the box.
Figure 3:
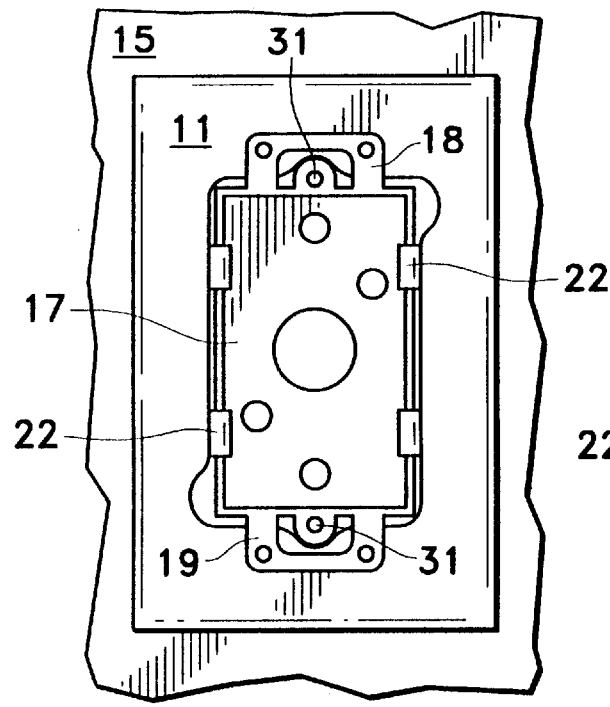
FIG. 3 is a front view of the wall of FIG.1 with the electrical box support frame in place and the electrical box retained therein.
Figure 8:
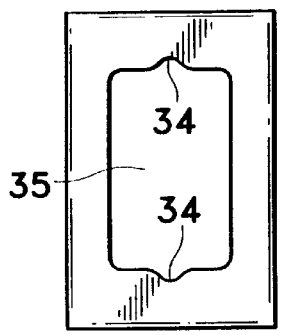
FIG. 8 is a front view of a second embodiment of the electrical support frame of the instant invention.

A second embodiment 30 of the frame as seen in FIG. 8 does not have the side recesses, but does have the centered recesses 34 in the top and bottom edges of the central opening 35. FIG. 1 shows the front face 15 of a wall with an opening 16 having been cut out for placement of an electrical box 17. The opening 16 in FIG. 1 has been cut too large for the electrical box. If the top retaining tab 18 of the electrical box is placed against the upper edge of the opening in the wall, the bottom retaining tab 19 will not make any contact with the wall and there is no way to secure the electrical box. In FIG. 3 the support frame 10 has been placed against the wall 15 and the central opening 12 of the frame 10 is directly over the opening in the wall. The electrical box 17 has been inserted through the frame into the wall opening. The top retaining tab 18 and the bottom retaining tab 19 both rest against the plate 11.

Figure 5:
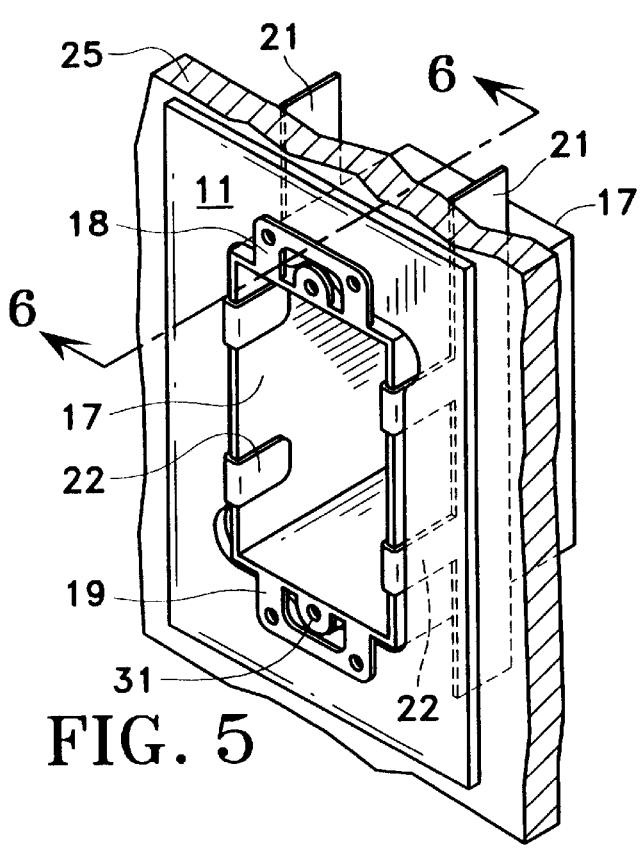
FIG. 5 is a perspective view showing the electrical box support frame with the electrical box holders and the electrical box installed in the wall.
Figure 6:
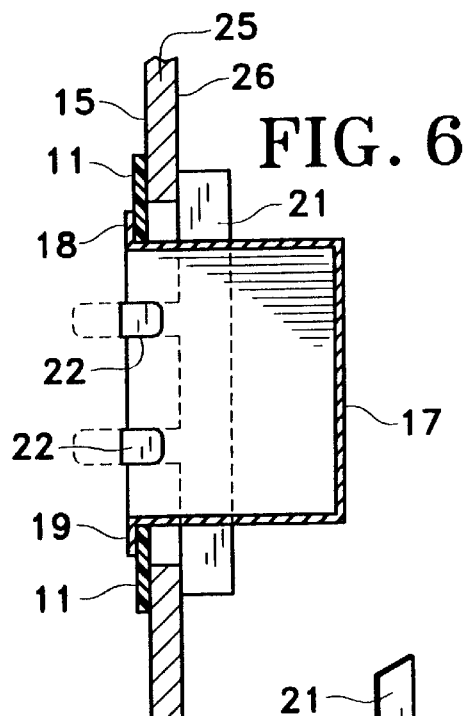
FIG. 6 is a side view through line 6—6 of FIG.5.
Figure 7:
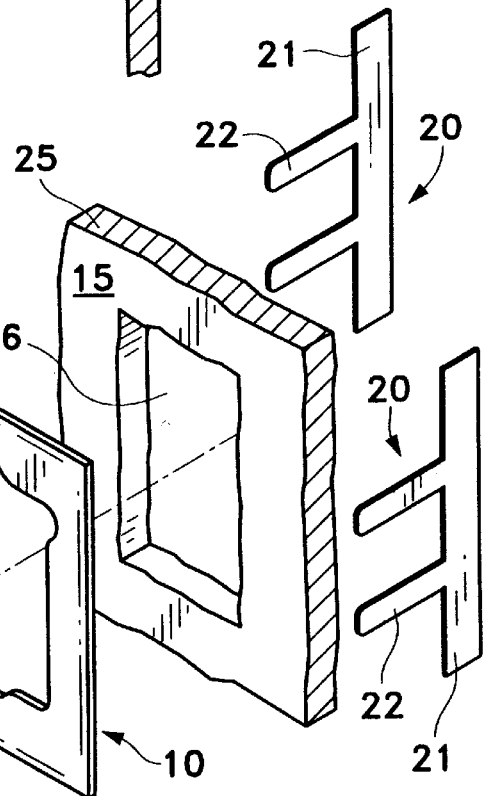
FIG. 7 is an exploded view showing the electrical box holders, the wall, the frame, the electrical box, a socket and a cover plate.

Electrical box holders such as the holders 20 illustrated in FIGS. 5, 6 and 7 are used to secure the electrical box 17 to the frame 10. The holders illustrated are thin metal clips consisting of a vertical strip 21 that is longer than the height of the electrical box and has two horizontal projections or fingers 22 extending from one vertical edge and equidistant from the ends of the strip. Two holders 20 are inserted through the frame into the wall opening before the electrical box is seated. The fingers 22 are thereafter bent outward, the electrical box 17 put in position, and the fingers bent down inside the box. The vertical edge of the strip 21 rests against the back surface 26 of the wall 25 and the fingers 22, when properly bent inside the electrical box, cause retaining tabs 18 and 19 of the electrical box 17 to rest against the plate 11 and hold the electrical box 17 securely in place . This can be seen in FIGS. 3, 5 and 6.

Figure 4:
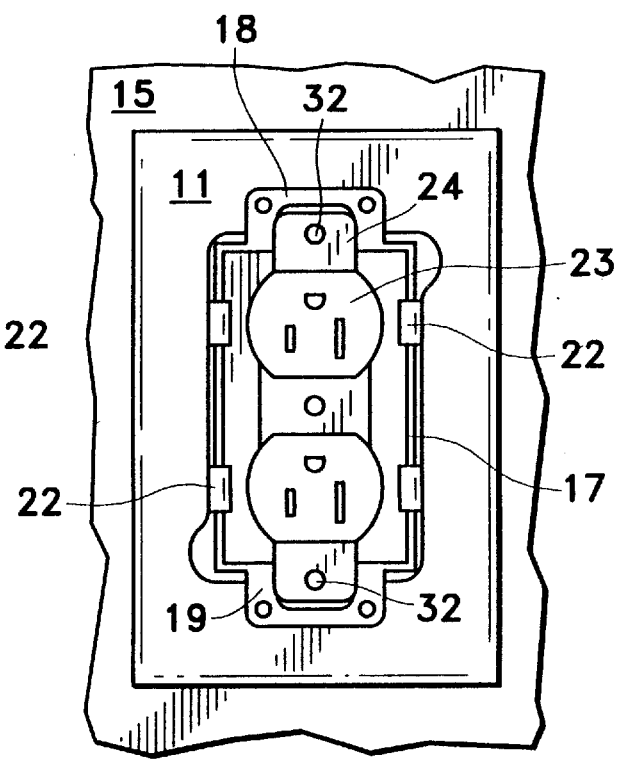
FIG. 4 is a front view as in FIG.3 with an electrical socket installed in the electrical box.

Once the electrical box 17 is securely in place, the socket, switch or other connection can be installed. FIG. 4 shows an electric socket 23 placed in the electrical box 17. The screw apertures 32 in the socket retaining tabs 24 register with the screw openings 31 in the electrical box retaining tabs 18 and 19 and these in turn register with the upper and lower center recesses 13 in the plate 11 which are provided for the clearance of the fastening screws. The alignment of the apertures 32, openings 31 and center recesses 13 allows the socket, switch or other electrical device to be easily secured to the electrical box 17. A cover plate 29 is then placed over the socket and secured in the usual manner. FIG. 7 is an exploded view illustrating how the aforementioned parts interact.

Figure 9:
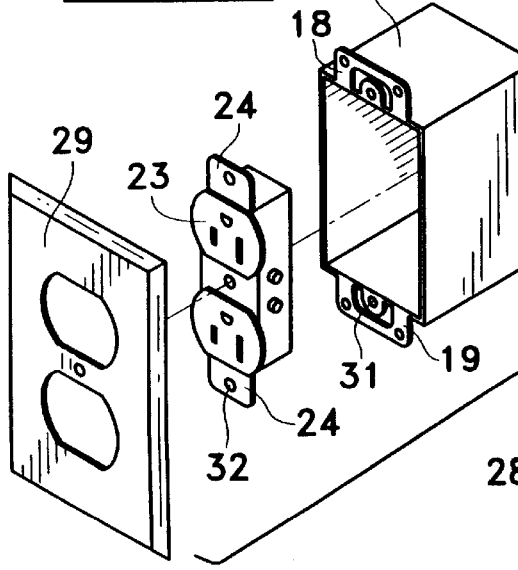
FIG.9 is a perspective view of the reverse side of a corner of the electrical support frame showing the retaining points.

When the frame 10 is placed against the wall there may be a tendency for it slip before tension is applied with the electrical box holders. To remedy this, retention points 28 can be added to the reverse side 27 of the plate 11. These can be placed at the corners as seen in FIG. 9 or at any desired location on the reverse side of the plate. The retention points can be made in any sizes or shapes known in the art. If the frame 10 is made of molded plastic, the retention points can be included in the molding process. If a wooden frame is used, small metal points can be used, or a tab with points can be affixed to the reverse side of the plate. Retention points are particularly helpful when the installation is in gypsum wallboard.

The frame of the instant invention can be made the same size as the conventional coverplates, the size of "oversized" cover plates, or in any other desired dimensions. Sets of frame and coverplate can be sold together and manufactured in the same size, material and color so that the two when used together give the appearance of a single piece, or when needed to cover an oversized wall opening, the frame can be larger than the cover plate with a groove or ridge into which the cover plate can be fitted to provide the look of a single piece. The frame can also be manufactured of transparent plastic so it is not noticeable or in any color or texture to blend with the wall. In the latter forms the frame of the instant invention is most useful when the wall opening is inadvertently cut larger than the dimensions of the electrical box. The frame does not detract from the appearance of the wall and the regular cover plate is the only thing that is really seen.

The frame of the instant invention can be made to accommodate single, double, triple or other electrical box requirements.

While two embodiments of the instant invention have been illustrated and described in detail, it is to be understood that this invention is not limited thereto and may be otherwise practiced within the scope of the following claims.

I claim:

1. In combination with an electrical box having an accessible enclosed interior and top and bottom retaining tabs, an electrical box support frame for use on an outer surface of a wall directly over a wall opening when the wall opening is irregular or substantially larger than the electrical box, said frame comprising: a rectangular plate of a thin rigid material, larger than the wall opening, and having a front face, a back face and at least one rectangular aperture sized to just allow the electrical box to pass easily therethrough with the retaining tabs engaging the front face of said plate, said aperture having a top edge, a bottom edge and two side edges, there being a recess in the center of the top edge and of the bottom edge.

2. An electrical box support frame as in claim 1 further comprising diagonally opposed recesses, one on each side edge of the aperture.

3. An electrical box support frame as in claim 1 further comprising retention means situated on the back face of the plate, said retention means to prevent slippage of said support frame and assist in maintaining the support frame in proper orientation and in contact with an outer surface of a wall during installation of the electrical box.

4. In combination with a wall having an inner surface, an outer surface and an opening therethrough, said opening being irregular or substantially larger than an electrical box, an electrical box of a type having an accessible enclosed interior and top and bottom retaining tabs, and two electrical box holders situated against the inner surface of the wall and having fingers extending through the opening in the wall, an electrical box support frame comprising: a rectangular plate of a thin rigid material, larger than the wall opening, and having a front face, a back face and at least one rectangular aperture sized to just allow the electrical box to pass easily therethrough with the retaining tabs engaging the front face of the plate, said aperture having a top edge, a bottom edge and two side edges, there being a recess in the center of the top edge and of the bottom edge, wherein when the support frame is placed on the outer surface of the wall over the opening, the electrical box is inserted into the wall through at least one rectangular aperture and the fingers of the electrical box holders are bent down inside the electrical box, the electrical box is maintained securely in place and the desired connections and installation of electrical devices can be made.

5. An electrical box support frame as in claim 4 further comprising retention means situated on the back face of said plate, said retention means to prevent slippage of said support frame and assist in maintaining the support frame in proper orientation and in contact with the outer wall surface during installation of the electrical box.

6. An electrical box support frame as in claim 4 further comprising diagonally opposed recesses, one on each side edge of said aperture.

7. In combination with a wall having an inner surface, an outer surface and an opening therethrough, an electrical box of a type having an accessible enclosed interior and top and bottom retaining tabs, and two electrical box holders of a type consisting of a vertical flat strip of rigid but somewhat ductile metal and having two spaced horizontal fingers integral therewith, projecting from one vertical edge and adapted to be bent over sides of the electrical box, and said strip being of sufficient length to provide substantial engagement with the inner surface of the wall adjacent the opening, when said opening is irregular or substantially larger than the electrical box or there is no internal anchoring means within the wall, an electrical box support frame comprising: a rectangular plate of a thin rigid material, larger than the wall opening, and having a front face, a back face and a central rectangular aperture sized to just allow the electrical box to pass easily therethrough with the retaining tabs engaging the front face of the plate, said aperture having a top edge, a bottom edge and two side edges, there being a recess in the center of the top edge and of the bottom edge for clearance of screws used to affix an electrical device to said electrical box, wherein when the two holders are placed inside the wall opening, the support frame is placed on the outer surface of the wall over the opening, the electrical box is inserted into the wall through the central rectangular aperture and the fingers of the two holders are bent over the sides of the electrical box with the vertical edges of the holders being flush against the inner surface of the wall, and the retaining tabs of the electrical box are held fast against the support frame, the electrical box is maintained securely in place and the desired connections and installation of electrical devices can be made.

8. An electrical box support frame as in claim 7 further comprising retention means situated on the back face of said plate, said retention means to prevent slippage of said support frame and assist in maintaining the support frame in proper orientation and in contact with the outer wall surface during installation of the electrical box.

9. An electrical box support frame as in claim 7 further comprising diagonally opposed recesses, one on each side edge of said aperture.

10. A method for installing an electrical box having an accessible enclosed interior and top and bottom retaining tabs in an opening in a wall having an outer surface and an inner surface, when the opening in the wall is irregular or substantially larger than the electrical box or there is no internal anchoring means within the wall said method comprising the steps of: obtaining an electrical box support frame in the form of a rectangular plate of a thin rigid material, larger than the wall opening, and having a front face, a back face and a central rectangular aperture sized to just allow the electrical box to pass easily therethrough, said aperture having a top edge, a bottom edge and two side edges, there being a recess in the center of the top edge and of the bottom edge for clearance of screws used to affix an electrical device to said electrical box, and diagonally opposed recesses, one on each side edge; placing said plate in contact with the outer surface of the wall and directly over the wall opening such that said opening is completely covered by the plate and the rectangular aperture is centered over said opening; inserting two electrical box holders into the wall opening through the aperture in the plate, said electrical box holders being of a type consisting of a vertical flat strip of rigid but somewhat ductile metal and having two spaced horizontal fingers integral therewith and projecting from one vertical edge and said strip being of sufficient length to provide substantial engagement with the inner surface of the wall adjacent the opening; bending the fingers back over the side edges of the aperture; inserting the electrical box through the aperture and into the wall opening until the retaining tabs engage the front face of the plate; bending the fingers over sides of and down into the electrical box so that the retaining tabs are contiguous with the front face of the plate and the vertical edges of the strips are in intimate contact with the inner surface of the wall; wherein the electrical box is held securely and the desired connections and installation of electrical devices can be made.

11. A method for installing an electrical box as in claim 10 wherein the rectangular plate has retention means on its back face, and further comprising the additional step of pressing the plate against the outer surface of the wall so that said retention means assist in maintaining the electrical box support frame in proper orientation and in intimate contact with the outer surface of the wall such that said frame does not slip during installation of the electrical box.

* * * * *

UNITED STATES PATENT AND TRADEMARK OFFICE
CERTIFICATE OF CORRECTION

PATENT NO. : 5,828,002
DATED : October 27, 1998
INVENTOR(S) : Waynne Fedun

It is certified that error appears in the above-identified patent and that said Letters Patent is hereby corrected as shown below:

On the cover page: Item [75] Inventors: delete "Wayne" and substitute -- Waynne --.

Signed and Sealed this

Second Day of February, 1999

Attest:

*Acting Commissioner of Patents and Trademarks*

*Attesting Officer*